Figure 1:
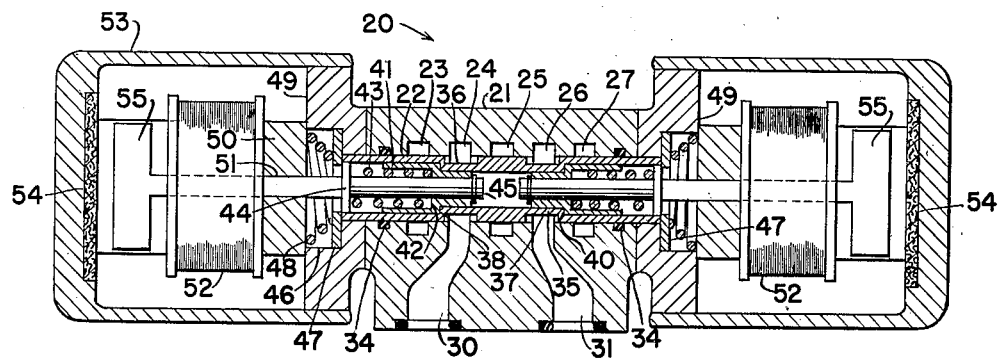

Nov. 25, 1952     W. E. RENICK     2,619,121

SOLENOID OPERATED VALVE

Filed Oct. 1, 1947

*INVENTOR.*
WENDELL E. RENICK
BY
Herschel C. Omohundro
attorney

Patented Nov. 25, 1952

2,619,121

UNITED STATES PATENT OFFICE 2,619,121

SOLENOID OPERATED VALVE

Wendell E. Renick, Grove City, Ohio, assignor to The Denison Engineering Company, Columbus, Ohio, a corporation of Ohio Application October 1, 1947, Serial No. 777,259

10 Claims. (Cl. 137—703)

This invention relates generally to apparatus for controlling the flow of fluids, and is particularly directed to a valve mechanism which is operated by electric solenoids.

One of the objects of this invention is to provide a valve operated by a solenoid in which valve the armature of the solenoid is permitted to move a portion of its travel to gain momentum before movement of the movable valve element is initiated. It has been determined that in solenoids the greatest attraction for the core of the solenoid is exerted when the solenoid is in a certain position relative to the magnetic field of the solenoid.

It is, therefore, an object of this invention to provide a mechanism having a valve with a movable element and a motion-transmitting connection between such element and the core of the solenoid which will permit the solenoid core to move and store up energy in another element, which energy will be transmitted to the movable element of the valve subsequent to the initial movement of the solenoid core. In this manner the core is permitted to approach the position wherein the greatest energy is exerted thereon by the magnetic field before the valve element starts to move with the result of applying to the valve element a greater force than would be applied thereto if a positive connection were provided between the valve element and the solenoid core.

Another object of the invention is to provide a solenoid-operated valve in which spring means are provided for storing up the energy of the solenoid during the initial movement of the core thereof, so that during the final movement of such core a total force of considerable magnitude will be available to move the valve element.

A still further object of the invention is to provide a valve and solenoid means for moving the same together with a lost motion connection between the solenoid and the valve spool.

It is another object of the invention to provide a control valve having a spool and a solenoid mechanism for moving the spool together with a motion transmitting connection between the movable element of the solenoid and the spool, which motion transmitting connection includes a compression spring, a shoulder on the spool for engagement by the compression spring, and means engaged by the solenoid core for transmitting movement thereof to the spring, the latter serving to transmit such movement to the valve spool.

Further objects and advantages of the present invention will be apparent from the following description, reference being had to the accompanying drawings wherein a preferred form of embodiment of the invention is clearly shown.

Figure 2:
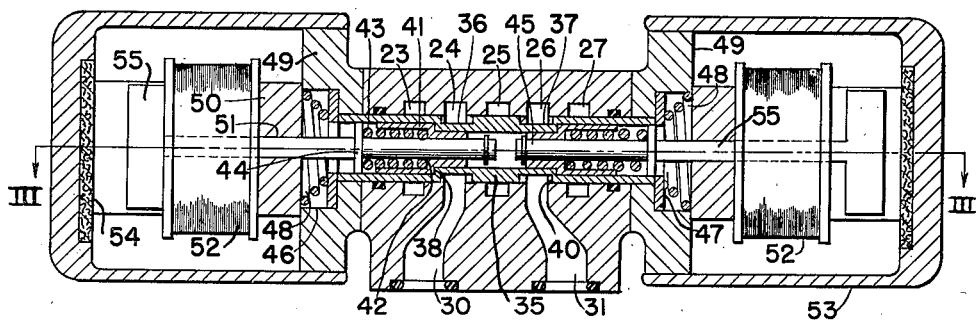
Figure 3:
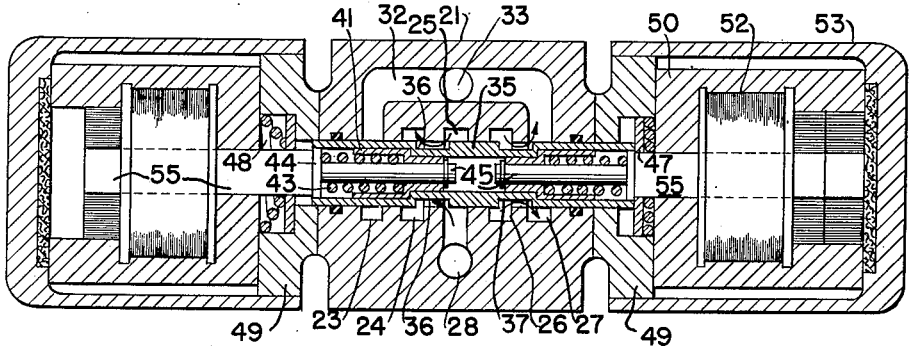

In the drawings:

Figures 1, 2 and 3 are longitudinal sectional views taken through a solenoid-operated valve formed in accordance with the present invention, Figure 3 being taken on the plane indicated by the line III—III of Figure 2, both Figures 2 and 3 showing the valve in different stages of operation.

Referring more particularly to the drawing, the numeral 20 designates the solenoid-operated valve in its entirety. This valve includes a valve body 21 in which is provided a longitudinal bore 22 and a plurality of ports 23 to 27, inclusive, spaced longitudinally of the bore. Port 25 is located substantially at the mid-point of the length of the bore, and is connected with a laterally extending passage 28 through which fluid under pressure may be introduced into the valve. Ports 24 and 26 are located at either side of the port 25 and are connected with passages 30 and 31 which open to one of the side surfaces of the body 21 for connection with a hydraulic system. These ports 24 and 26 are commonly termed cylinder ports in valves of this type. Ports 23 and 27 are disposed adjacent the ends of the body 21 and are connected by a passage 32 which in turn is connected with a passage 33 leading to the exterior of the body, these passages 32 and 33 serving as the exhaust outlet of the valve. Packing rings 34 surround the bore 22 between the ports 23 and 27 and the ends of the valve body. These packing rings prevent the escape of fluid between the side wall of the bore 22 and a valve spool 35 disposed for longitudinal movement therein.

This valve spool 35 has a pair of spaced annular grooves 36 and 37 provided in the exterior thereof, these grooves being adapted to establish communication between certain of the ports in different positions of longitudinal movement of the valve spool. When the spool is centered longitudinally of the bore as shown in Figures 1 and 2, the grooves are inoperative, each of the ports being unconnected with any of the others. When the valve spool is moved to the right, as illustrated in Figure 3, annular groove 36 will establish communication between the inlet port 25 and cylinder port 24, so that fluid introduced through passage 28 may flow to port 25, through groove 36 to port 24 and outwardly from the valve body through passage 30. At this time also groove 37 establishes communication between cylinder port 26 and outlet port 27, thus fluid introduced into the valve body through passage 31 may flow to port 26, through groove 37 to port 27 and outwardly from the valve body through passages 32 and 33.

In this instance spool 35 is of tubular form and is provided with a pair of outwardly facing, spaced, internal shoulders 38 and 40. These shoulders are formed for engagement by similar shoulders provided on sleeves 41, these sleeves being received by the spool 35. Sleeves 41 also have internal shoulders 42 which constitute abutments for the ends of compression-type coil springs 43, the opposite ends of which engage heads 44 formed on pins 45, the shanks of these pins being received for sliding movement in the shouldered sleeves. The heads of the pins 44 are of a sufficiently small size to be slidably received by the end portions of the spool 35.

The ends of the body 21 have solenoid-supporting plates 49 affixed thereto, these plates having openings which register with the bore 22 in the body 21 and are counterbored on the outer sides as at 46 to receive washers 47. These washers engage the ends of the spool 35 on one side and spiral springs 48 on the other sides, the springs also engaging block members 50 which form parts of the solenoid supports. These block members are secured by suitable means to the plates 49 and are also provided with openings 51 in registration with the openings in the plates 49 and the bore 22. The openings 51 slidably receive the cores 55 of the solenoids. These cores may be formed in the conventional manner, those illustrated having a central body and laminations of suitable shape affixed thereto. The blocks 50 also support field coils 52 of the solenoids, these coils being connected by suitable leads with a source of electric current when the valve mechanism is in use. The mechanical portion of the valve mechanism also includes covers 53 for the solenoid, these covers carrying fibrous disks 54 in registration with the solenoid cores to serve as resilient stop members.

In the operation of the valve one of the field coils is energized at a time to attract its armature or core. When so attracted, the core will move toward the valve body also moving the headed pin toward the center of the body or into the valve spool as shown in Fig. 2, the coil at the left end of the device being energized in this figure. This movement of the core causes the spring 43 at this end of the valve to be compressed to store up some of the energy of the solenoid. As the core approaches the limit of its travel the greatest magnetic force will be exerted thereon. When the total force including that stored in the coil spring 43 and the magnetic attraction of the armature becomes sufficient to overbalance the force tending to hold the valve spool stationary, this valve spool will move in the proper direction. After once starting to move, the coil spring will continue the movement even though the core of the particular solenoid may have previously reached the limit of its movement. When so moving, the spiral spring 48 at the opposite end of the valve will be compressed as illustrated in Fig. 3 and when the field coil is deenergized this spiral spring will expand to move the valve spool back to its centered position. The device will then be in condition for a subsequent operation.

While a four-way spring-centered valve has been illustrated, it should be obvious that the principles of the invention could be employed in valves of different types without departing from the spirit and scope of the invention.

While the form of embodiment of the present invention as herein disclosed constitutes a preferred form, it is to be understood that other forms might be adopted, all coming within the scope of the claims which follow.

I claim:

1. A solenoid-operated valve comprising a body with a bore and ports spaced longitudinally thereof; spool means disposed for movement in said bore to control communication between certain of said ports; resilient means biasing said spool means in one direction; solenoid means including a movable element for moving said spool means in opposition to said resilient means; motion-transmitting means between the movable element of said solenoid and said spool means; and a resilient element forming part of said motion-transmitting means, said resilient element receiving and storing energy from said solenoid and subsequently transmitting such energy to said spool means.

2. A solenoid-operated valve comprising a body with a bore and ports spaced longitudinally thereof; spool means slidably disposed in said bore to control communication between certain of said ports; solenoid means including a movable element for sliding said spool means in said bore; motion-transmitting means between the movable element of said solenoid and said spool means; and a resilient element forming part of said motion-transmitting means, said resilient element receiving and storing energy from said solenoid before said spool means moves and subsequently transmitting such energy to said spool means to move the same.

3. A solenoid-operated valve comprising a body with a bore and ports spaced longitudinally thereof; spool means slidably disposed in said bore to control communication between certain of said ports; solenoid means including a movable element for sliding said spool means in said bore; motion-transmitting means between the movable element of said solenoid and said spool means; and a spring forming a part of said motion-transmitting means, the operation of said solenoid serving to compress said spring before said spool is moved, the subsequent expansion of said spring serving to move said spool means.

4. A solenoid-operated valve comprising a body with a bore and ports spaced longitudinally thereof; a spool having oppositely facing internal shoulders disposed for sliding movement in said bore to control communication between said ports; a solenoid at each end of said body, each of said solenoids having a movable element; and a coil spring between the movable element of each of said solenoids and the adjacent internal shoulders on said spool for transmitting movement from the solenoids to the spool.

5. A solenoid-operated valve comprising a body with a bore and ports spaced longitudinally thereof; a spool member disposed for movement in said bore to control communication between said ports, said spool having oppositely facing shoulders; spring means normally tending to maintain said spool in a certain position in said bore; a solenoid at each end of said body, each of said solenoids having a movable element; and a coil spring between the movable element of each solenoid and the adjacent shoulder on said spool.

6. A solenoid-operated valve comprising a body with a bore and ports spaced longitudinally thereof; a spool member disposed for movement in said bore to control communication between said ports; opposed resilient means at opposite ends of said spool resisting displacement thereof in either direction; mean for limiting the effect of said resilient means; a solenoid at each end of said body, each of said solenoids having a movable element; and a compression spring between the movable element of each of said solenoids and said spool, said compression springs permitting initial movement of the solenoid prior to movement of said spool.

7. A solenoid operated valve comprising a body with a bore and ports spaced longitudinally thereof; spool means disposed for movement in said bore to control communication between certain of said ports; said spool preventing communication between any ports when in a longitudinally centered position in said bore; resilient means tending to retain said spool in said centered position; solenoid means having a movable core at either end of said body; and a resilient element between each of said cores and said spool, the motion of said cores being transmitted to said spool solely through said resilient elements.

8. A solenoid operated valve comprising a body with a bore and ports spaced longitudinally thereof; spool means disposed for movement in said bore to control communication between certain of said ports; said spool preventing communication between any ports when in a longitudinally centered position in said bore; resilient means tending to retain said spool in said centered position; solenoid means having a movable core at either end of said body; a resilient element between each of said cores and said spool, the resiliency of the last-mentioned elements being greater than that of the first-mentioned resilient means, the motion of said cores being transmitted to said spool solely through said resilient elements.

9. A solenoid operated valve comprising a body with a bore and ports spaced longitudinally thereof; spool means disposed for movement in said bore to control communication between certain of said ports; resilient means tending to retain said spool in a certain position; solenoid means having a movable core disposed at one end of said body; and a resilient element between said core and said spool, the motion of said core being transmitted to said spool solely through said resilient element.

10. A solenoid operated valve comprising a body with a bore and ports spaced longitudinally thereof; spool means disposed for movement in said bore to control communication between certain of said ports; spring means of predetermined strength tending to retain said spool in a certain position; solenoid means having a movable core disposed at one end of said body; and a second spring means of greater strength than the first-mentioned spring means between said core and said spool, the motion of said core being transmitted to said spool solely through said second spring means.

WENDELL E. RENICK.

REFERENCES CITED

The following references are of record in the file of this patent:

UNITED STATES PATENTS

| Number | Name | Date |
| --- | --- | --- |
| 1,383,432 | Simon | July 5, 1921 |
| 1,603,005 | Flam | Oct. 12, 1926 |
| 2,145,404 | Osborne | Jan. 31, 1939 |
| 2,219,896 | Harrington | Oct. 29, 1940 |
| 2,251,747 | Losey | Aug. 5, 1941 |
| 2,251,750 | Miller | Aug. 5, 1941 |
| 2,269,016 | Gille | Jan. 6, 1942 |
| 2,296,132 | Wiseley | Sept. 15, 1942 |
| 2,404,349 | Brant | July 23, 1946 |